Patented July 17, 1928.

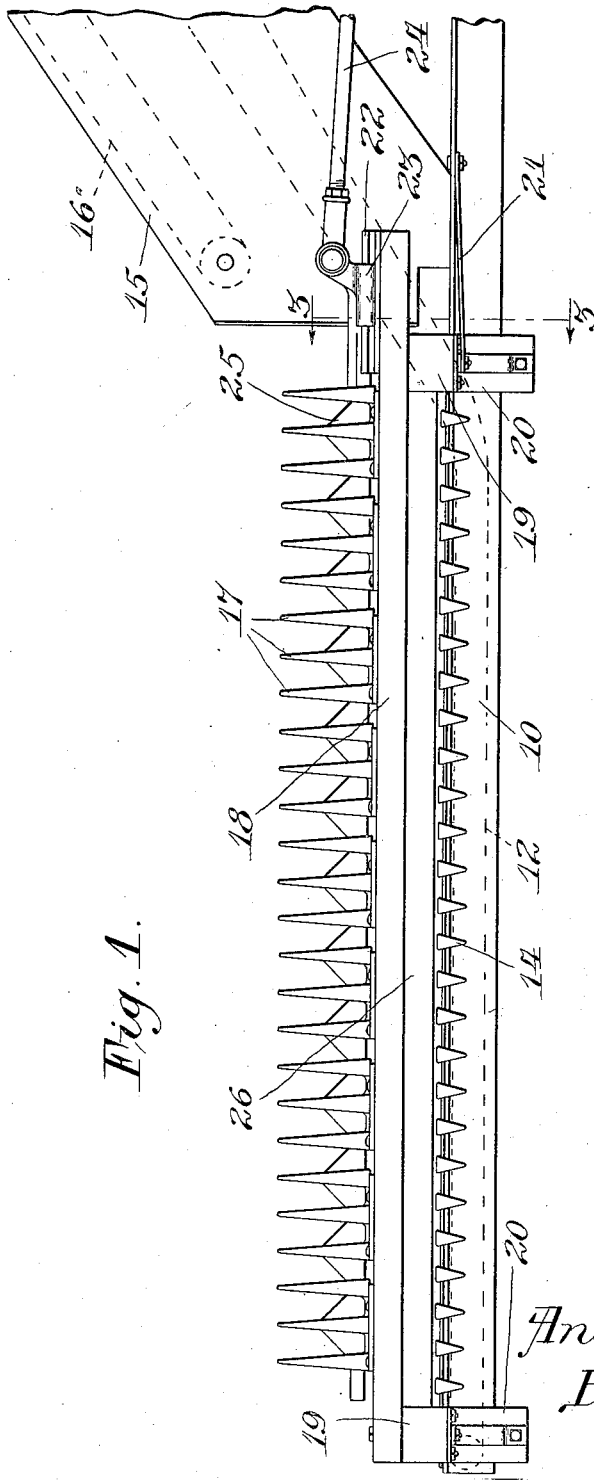
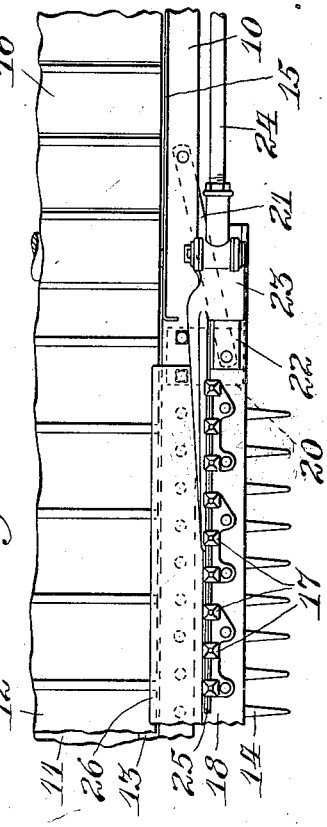
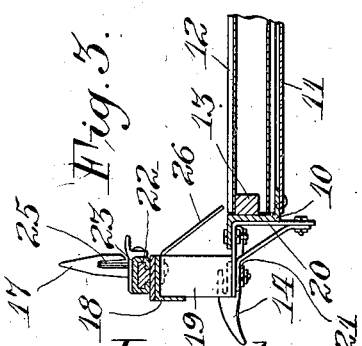

1,677,479

UNITED STATES PATENT OFFICE.

ANDREW L. JOHNSON, OF CHICAGO, ILLINOIS, ASSIGNOR TO INTERNATIONAL HARVESTER COMPANY, A CORPORATION OF NEW JERSEY.

KAFIR-CORN-CUTTING ATTACHMENT.

Application filed September 25, 1925. Serial No. 58,513.

This invention appertains generally to cutting mechanisms. More particularly it relates to a supplemental cutting mechanism adapted for attachment to a conventional harvester platform such as the platform of a harvester thresher, said cutting mechanism being operable in a vertical plane for cutting the heads from kafir corn and the like; the same adapted for cooperation with a conveyer mechanism, the conveyer delivering the material to the feeder of such harvester thresher for feeding the material into the threshing mechanism to be threshed.

Such an attachment has great utility in regions where harvester threshers are employed and where kafir corn is grown, such attachment permitting the harvester thresher to be used as a stationary thresher for threshing kafir corn heads cut by said attachment.

Accordingly it is an object of this invention to provide a simple and inexpensive cutting mechanism adapted for attachment to the platform of harvester threshers and the like for removing the heads from kafir corn.

It is another object of this invention to make such an attachment as practicable as possible with a minimum of expense by constructing the same in such a manner that it may be operated by the conventional pitman now employed in these machines for operating the main cutting mechanism thereof when the same is employed as a traveling machine.

Another object is to provide an attachment of the kind specified which will be readily attachable and detachable with a minimum of effort.

Other objects will appear as the description hereof progresses.

Briefly these objects are attained in the provision of a supplementary cutting mechanism carried on supporting blocks and arranged for operation in a vertical plane at the front end of the platform of a harvester thresher or the like and in a position slightly above the conventional horizontally disposed cutting mechanism thereof, which remains in position on the platform, plus a deflecting means associated with the vertically operable cutting mechanism for directing material cut thereby onto the conventional conveyer disposed to the rear thereof on the harvester platform.

In the accompanying sheet of drawings, the preferred embodiment of the invention has been illustrated and therein,—

Fig. 1 is a front elevational view of a harvester platform showing the improved attachment supported thereon;

Fig. 2 is a plan view of a part of the mechanism disclosed in Fig. 1; and

Fig. 3 is a detail sectional view taken along the line 3—3 of Fig. 1.

For the purpose of illustrating the improved cutting mechanism, a conventional harvester or harvester thresher having a Z-bar 10 for supporting the front end of a harvester platform 11 is shown, the platform carrying the usual transversely operating slatted conveyer apron 12, the upper run of which runs over strips 13 carried by the rear side of the Z-bar 10, while the lower run thereof runs over the rearwardly projecting ledge of the Z-bar, as shown in Fig. 3. The Z-bar supports in a conventional manner the usual horizontally disposed finger bar and cutting mechanism 14, which is used, of course, when the harvester is employed as a traveling machine. The conveyer 12 at its stubbleward end is inclined upwardly, as is usual in these machines, and is supported in upwardly inclined side frame members 15 (only one being shown) carried on the frame, this conveyer cooperating with an upper conveyer 16 for delivering the material cut by the machine to a feeding mechanism, not shown, for feeding the material to a threshing mechanism, also not shown.

Kafir corn cannot be cut in the field and harvested as can lighter grains, or conventionally harvested; it must be cut in the manner of cutting corn and cured for a period of time before the same is ready for threshing. It is very desirable, therefore, for owners of a harvester thresher to be able to employ such a machine as a stationary thresher for handling kafir corn after it is ready for threshing. The attachment device of the present invention makes this possible, and, as shown in the drawings, comprises guard fingers 17 disposed in a vertical position on a bar 18 carried on blocks 19 bolted to brackets 20, which in turn are bolted to the Z-bar 10, the bar 18 being arranged just above the horizontally disposed cutting mechanism in a position slightly forwardly of the conveyer apron 12 and preferably extending along the entire length thereof, as shown. A supplementary brace 21 may be provided for connection to the Z-bar, as shown, to provide a more rugged construction. The bar 18 at its stubbleward end is provided with a guide piece 22 over which is reciprocable a conventional knife head 23, to which is pivoted in a conventional manner the pitman 24, the knife head, it being understood, being rigidly secured to a knife section bar 25 so that when the pitman is operated, the knife head will slide over the guide 22 and reciprocate the knives 25 between the fingers 17. A deflector shield 26 is secured in any suitable way to the under side of the vertically disposed supplementary cutting mechanism just described and inclines rearwardly, as shown in Fig. 3, to deflect cut material onto the conveyer 12.

The present invention contemplates the use of two knife sections, that is, one for each finger bar, however, only a single knife section 25 may be used with either the horizontally disposed mechanism or the vertically disposed cutting mechanism, and the invention further contemplates use of a single pitman which interchangeably is adapted to operate either cutting mechanism. It should be understood, of course, that when the machine is employed as a traveling harvester for cutting light grains, the supplementary, vertically arranged cutting mechanism is not used, the supplementary cutting device being employed only when the machine is standing still, the operator taking the heavier grains, such as kafir corn stalks, anl laying them between the vertical finger guards 17 to remove the heads therefrom. To fit the attachment to the machine for stationary cutting, it will, of course, be necessary to remove certain parts employed when the machine is traveling, to make room for the attachment. For instance, the reel support and certain of the guard fingers of the horizontal cutting mechanism at the stubbleward end thereof will have to be removed to make room for the stubbleward block 19 and to permit attachment of the pitman to the knife head when operating the vertically disposed cutting mechanism. All of this will be quite clear and simple to anyone skilled in this art and it is not necessary, therefore, to illustrate all of this.

In the operation of the device as a stationary machine the vertically disposed cutting bar is fitted into position, as shown, and the same is reciprocated by the pitman to cut the heads from the grain. The shield 26 cooperates with this mechanism in a manner to direct the cut material onto the conveyer apron 12, as will be undertsood.

It is to be understood that certain changes in the preferred embodiment disclosed may be made by anyone skilled in this art without departing from the spirit of this invention as claimed in the subjoined claims.

What is claimed is:

1. The combination with a platform comprising a frame having a conveyer thereon, of a cutting mechanism rigidly carried at the front side of the platform and disposed in a vertical plane, and means for operating the cutting mechanism in such position.

2. The combination with a platform comprising a frame having a conveyer thereon, of blocks secured to the front side of the platform frame, a vertically disposed cutting mechanism carried by the blocks, and means to operate said mechanism in said position.

3. The combination with a platform comprising a frame having a conveyer thereon, of a cutter bar including cutting mechanism rigidly carried at the front side of the platform, said cutter bar being disposed in a vertical plane, and means for directing material cut by said mechanism onto the conveyer.

4. The combination with a platform comprising a frame having a conveyer thereon, of a cutter bar including cutting mechanism rigidly carried at the front side of the platform, said cutter bar being disposed in a vertical plane, and a deflector shield inclined rearwardly from the cutting mechanism to the conveyer to direct cut material onto said conveyer.

5. The combination with a platform comprising a frame having a conveyer thereon, of blocks secured to the front side of the platform frame, a cutter bar including cutting mechanism mounted in a vertical plane on said blocks, means for operating the cutting mechanism in such position, and a deflector shield secured to the blocks below the cutting mechanism and inclined rearwardly therefrom to direct cut material onto said conveyer.

6. The combination with a platform having a frame and a conveyer thereon, of blocks secured to the front side of said frame, a reciprocatory cutting mechanism carried on said blocks and disposed in a vertical plane, and means for reciprocating said cutting mechanism.

7. As an attachment for a harvester having a platform supported on a frame and carrying a conveyer thereon, a horizontally disposed finger bar and cutting mechanism carried on the front side of said frame, said attachment comprising a cutting mechanism disposed in a vertical plane and adapted to be carried on the front side of said frame directly above the first mentioned cutting mechanism, and a single means for operating either of said cutting mechanisms.

8. As an attachment for a harvester having a platform supported on a frame and carrying a conveyer thereon and a horizontally disposed finger bar and cutting mechanism carried on the front side of said frame, said attachment comprising a cutting mechanism adapted to be disposed in a vertical plane and carried on blocks secured to the front side of said frame above the first mentioned cutting mechanism, and a single driving means adapted for connection to either cutting mechanism.

9. As an attachment for a harvester having a platform supported on a frame and carrying a conveyer thereon and a horizontally disposed finger bar and cutting mechanism carried on the front side of said frame, said attachment comprising a cutting mechanism adapted to be disposed in a vertical plane and carried on blocks secured to the front side of said frame above the first mentioned cutting mechanism, a single driving means adapted for connection to either cutting mechanism, and a deflector shield embodied in the attachment for directing material cut by the vertically disposed cutting mechanism onto the conveyer.

10. As an attachment for a harvester having a platform and Z-bar, said attachment comprising brackets adapted to be secured to the Z-bar, blocks carried by the brackets, a cutter bar including cutting mechanism, said cutter bar being rigidly mounted on said blocks and disposed in a vertical plane, and a deflector disposed rearwardly of the cutting mechanism.

In testimony whereof I affix my signature.

ANDREW L. JOHNSON.